US012434368B2

(12) United States Patent
Ponce

(10) Patent No.: US 12,434,368 B2
(45) Date of Patent: Oct. 7, 2025

(54) HANDHELD PILEDRIVING APPARATUS

(71) Applicant: Carlos Ponce, Bryan, TX (US)

(72) Inventor: Carlos Ponce, Bryan, TX (US)

( * ) Notice: Subject to any disclaimer, the term of this patent is extended or adjusted under 35 U.S.C. 154(b) by 64 days.

(21) Appl. No.: 18/415,908

(22) Filed: Jan. 18, 2024

(65) Prior Publication Data

US 2025/0236002 A1 Jul. 24, 2025

(51) Int. Cl.

| | |
|---|---|
| ***B25D 9/02*** | (2006.01) |
| ***B25D 9/12*** | (2006.01) |
| ***B25D 9/16*** | (2006.01) |
| ***B25D 11/06*** | (2006.01) |
| ***E02D 7/04*** | (2006.01) |

(52) U.S. Cl.
CPC ................. *B25D 9/02* (2013.01); *B25D 9/12* (2013.01); *B25D 9/16* (2013.01); *B25D 11/06* (2013.01); *E02D 7/04* (2013.01)

(58) Field of Classification Search
CPC ........................................................ E02D 7/04
USPC ..... 173/90, 91, 127, 128; 405/228, 232, 244
See application file for complete search history.

(56) References Cited

U.S. PATENT DOCUMENTS 2,004,180 A * 6/1935 Adams ...................... E02D 7/10 91/352
3,961,672 A * 6/1976 Welsch ................. E04H 17/263 173/133
4,043,405 A * 8/1977 Kuhn ........................ E02D 7/10 173/127
4,119,159 A * 10/1978 Arentsen ................ E02D 13/10 173/133
4,405,369 A 9/1983 Nikitin
4,479,550 A * 10/1984 Kuhn ........................ E02D 7/02 173/83
4,817,734 A * 4/1989 Kuehn ...................... E02D 7/02 175/6
5,097,912 A 3/1992 Bowers
6,557,647 B2 * 5/2003 White ....................... E02D 7/10 173/91
6,598,683 B1 7/2003 Utimo
6,626,247 B1 * 9/2003 Nordlin ................... E02D 13/00 173/90
8,033,756 B2 * 10/2011 Adamson .................. E02D 7/02 405/228
8,955,612 B2 * 2/2015 O'Toole .................... E02D 7/00 173/132
9,803,388 B2 * 10/2017 Cunningham ........ E04H 17/263
D838,569 S 1/2019 Halstead
2002/0014342 A1 * 2/2002 White ....................... E02D 7/10 173/206
2002/0124371 A1 9/2002 Livingston
2011/0198104 A1 8/2011 Stockstill (Continued)

FOREIGN PATENT DOCUMENTS

DE 3910599 A1 * 10/1990 ............. B25D 17/26
WO WO2013052144 4/2013

*Primary Examiner* — Praachi M Pathak

(57) ABSTRACT

A piledriving apparatus for driving stakes or posts into the ground includes a housing and a ram mounted in the housing. A head is attached to the ram and defines a cavity for receiving a stake. The ram is operable to drive the head against the stake to urge the stake into the ground. Grips for holding the apparatus by the hands of a user are described and claimed. Controls for directing the direction, force, and speed of a piston rod of the ram is disclosed and claimed.

11 Claims, 3 Drawing Sheets

(56) References Cited

U.S. PATENT DOCUMENTS

| | | | | |
|---|---|---|---|---|
| 2012/0193111 | A1 | 8/2012 | Lechtenberg | |
| 2023/0151577 | A1* | 5/2023 | De Waard | E02D 13/04<br>405/228 |

* cited by examiner

HANDHELD PILEDRIVING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to piledrivers and more particularly pertains to a new piledriver for driving stakes or posts into the ground.

(2) Description of Related Art Including Information Disclosed Under 37 CFR 1.97 and 1.98

The prior art relates to piledrivers, including those designed to be held and operated by a user. However, the prior art fails to describe such a device that uses hydraulics to control a ram, a head adapted to 2×4 stakes, and controls for controlling the direction, speed, and force of the head.

BRIEF SUMMARY OF THE INVENTION

An embodiment of the disclosure meets the needs presented above by generally comprising a housing and a ram mounted in the housing. The ram comprises a base and a piston rod which is movably coupled to the base. The base is positioned in the housing, and the piston rod extends away from the base through a bottom end of the housing. The ram is operable to urge the piston rod alternately away from and toward the housing. A head is coupled to a distal end of the piston rod of the ram with respect to the base. The head defines a cavity in the head with a size and a shape such that the cavity is configured to be complementary in shape to a perimeter of a stake.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
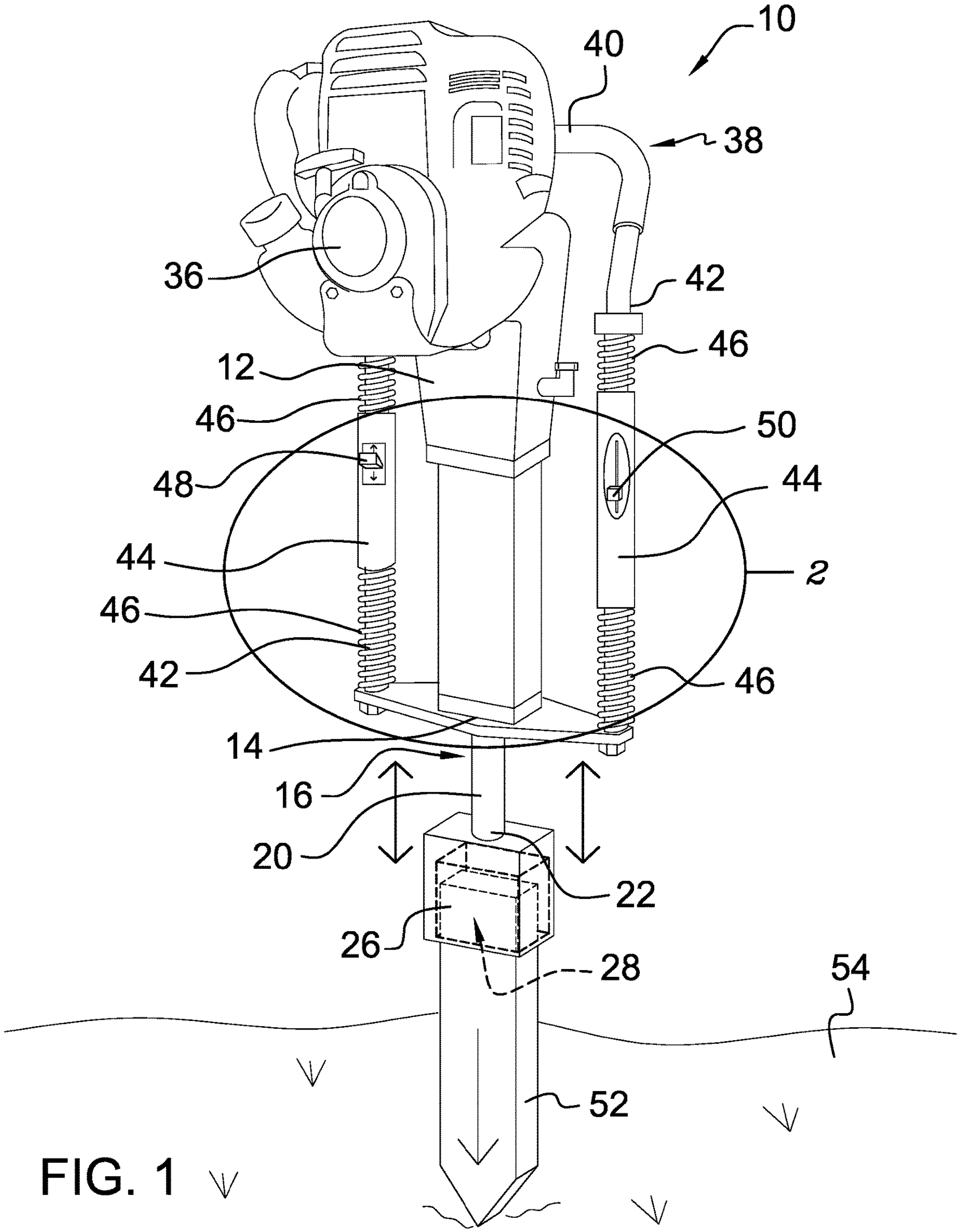
FIG. 1 is a perspective view of a piledriving apparatus according to an embodiment of the disclosure.
Figure 2:
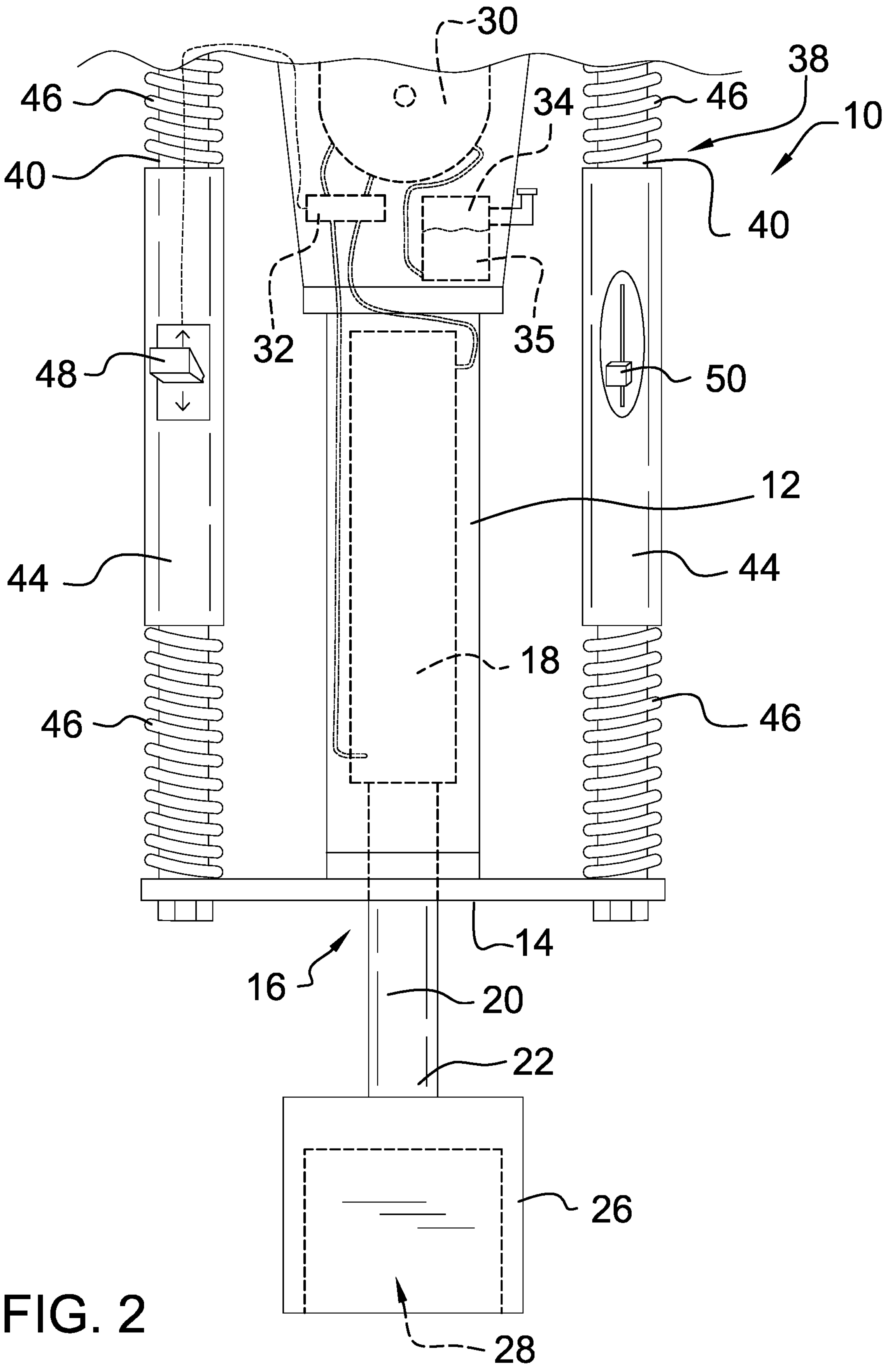
FIG. 2 is a detail view of an embodiment of the disclosure taken from Circle 2 in FIG. 1.
Figure 3:
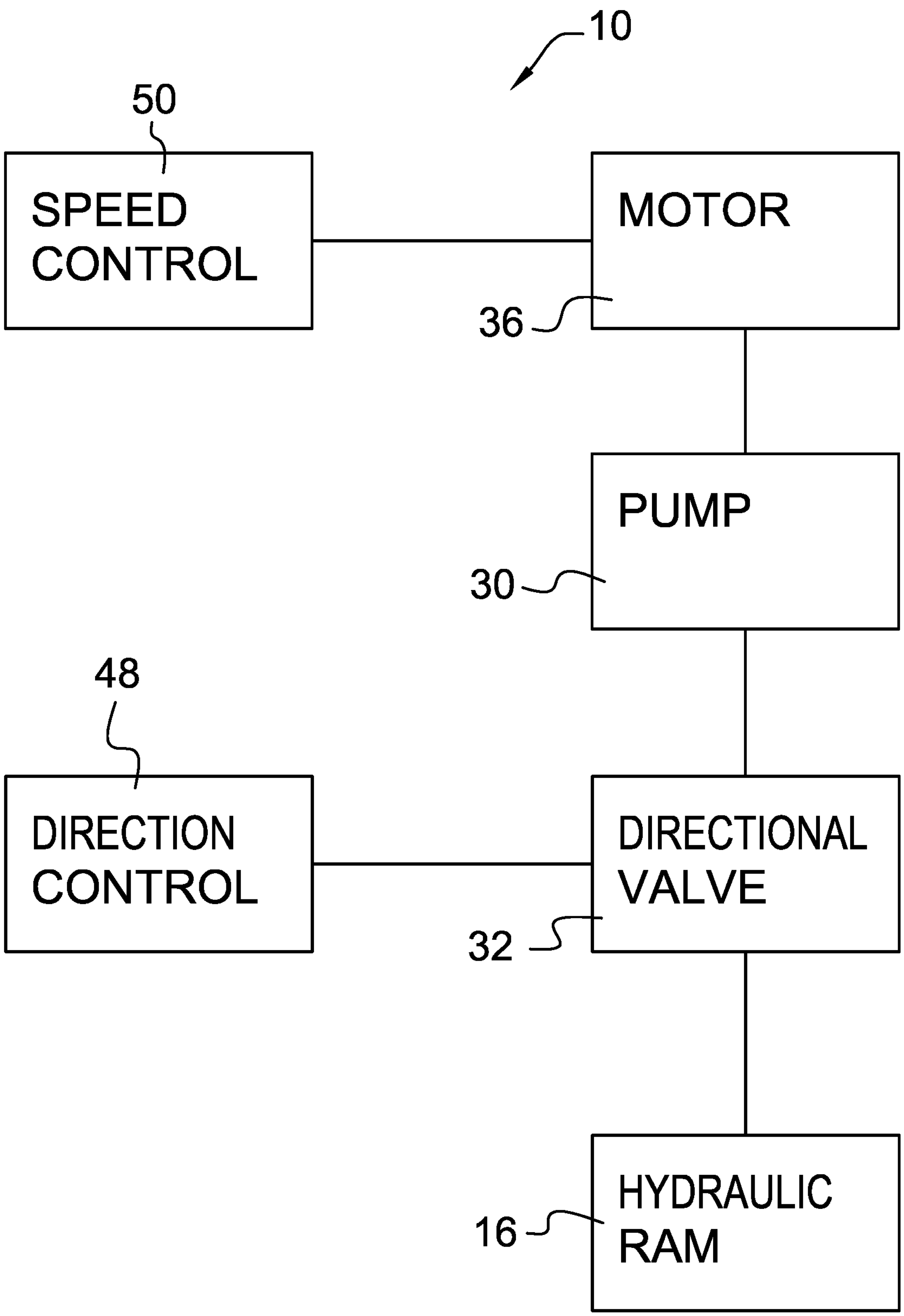
FIG. 3 is a block diagram of an embodiment of the disclosure.

With reference now to the drawings, and in particular to FIGS. 1 through 3 thereof, a new piledriver embodying the principles and concepts of an embodiment of the disclosure and generally designated by the reference numeral 10 will be described.

As best illustrated in FIGS. 1 through 3, the piledriving apparatus 10 generally comprises a housing 12 and a ram 16 mounted in the housing 12. The ram 16 comprises a base 18 and a piston rod 20. The base 18 is positioned in the housing 12 and the piston rod 20 extends through a bottom end 14 of the housing 12. The ram 16 is movable alternately downwardly and upwardly with respect to the base 18 and the housing 12. The ram 16 comprises a hydraulic cylinder but may include any suitable linear actuator such as a pneumatic cylinder, a linear motor 36, or the like. A head 26 is coupled to a distal end 22 of the piston rod 20 of the ram 16 with respect to the base 18. The head 26 defines a cavity 28 in the head 26 which has a size and a shape such that the cavity 28 is configured to be complementary in shape to a perimeter of a stake 52. A cross section of the cavity 28 taken perpendicular to the piston rod 20 has a rectangular shape with a width of at least 1.5 inches and a length of at least 3.5 inches.

In embodiments in which the ram 16 comprises a hydraulic cylinder, a hydraulic pump 30 is mounted in the housing 12 and is operatively coupled to the ram 16 via a control valve 32. A reservoir 34 is mounted in the housing 12 and contains a volume of hydraulic fluid 35 which the hydraulic pump 30 selectively urges through the control valve 32 to the ram 16 to selectively move the piston rod 20 alternately toward and away from the base 18. A motor 36 is mounted in the housing 12 and operatively coupled to the hydraulic pump 30. The motor 36 comprises an internal combustion engine but may comprise an electric motor or the like. The control valve 32 is in fluid communication with the hydraulic pump 30 and the ram 16 and is operable to direct the hydraulic fluid 35 from the hydraulic pump 30 to the ram 16 to selectively move the piston rod 20 of the ram 16 alternately toward and away from the base 18.

A handlebar 38 is mounted to the housing 12 and has an inverted U-shape with a pair of lateral portions 40 and a top portion 42. The top portion 42 is coupled to and extends between the pair of lateral portions 40. Each one of a pair of grips 44 is slidably mounted to an associated lateral portion 40 of the pair of lateral portions 40 of the handlebar 38. Each grip 44 is slidable alternately upwardly and downwardly with respect to the housing 12. A plurality of springs 46 is coupled to the pair of grips 44 and the handlebar 38. The plurality of springs 46 is configured to absorb sudden impulses exerted on the pair of grips 44 relative to the housing 12. The springs 46 are coil springs 46 which act alternately in compression and tension to absorb shocks produced by impulses exerted on the housing 12 when the piston rod 20 of the ram 16 moves suddenly upwardly or downwardly and when the ram 16 impacts the stake 52 or another object. In other embodiments, the springs 46 may be flat springs, torsion springs, gas springs, elastic members, or other suitable shock absorbing devices.

A directional switch 48 is operatively coupled to the control valve 32 and is mounted on one grip 44 of the pair of grips 44. The directional switch 48 is actuatable to selectively direct the piston rod 20 of the ram 16 to move alternately toward and away from the base 18. The control valve 32 or another control mechanism may be configured to direct the hydraulic fluid 35 back to the reservoir 34 or the hydraulic pump 30 when the piston rod 20 reaches a bottommost or uppermost position such that the hydraulic pump 30 is not caused to urge the piston rod 20 beyond the bottommost or uppermost positions. A speed control 50 is operatively coupled to the motor 36 and is operable to control a speed of the motor 36. The speed control 50 is mounted on another grip 44 of the pair of grips 44. When the directional switch 48 is actuated, the hydraulic pump 30 will be caused to urge the piston rod 20 in the direction selected via the directional switch 48 with a force and a speed associated with the speed for the motor 36 selected via the speed control 50.

In use, the piledriving apparatus 10 is used to drive stakes into a ground surface 54, such as during the construction of a fence or other structure. The grips 44 are grasped by a user's hands, and the direction, force, and speed of the piston rod 20 is controlled via the directional switch 48 and the speed control 50. Unlike other devices for driving stakes, posts, or the like, which only cause their rams to vibrate or move in automated reciprocal fashion, the motion of the piston rod 20 of the present invention may be controlled by the user as herein described.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A piledriving apparatus comprising:

a housing;

a ram being mounted in the housing, the ram comprising a base and a piston rod, the piston rod being movably coupled to the base, the base being positioned in the housing, the piston rod extending through a bottom end of the housing, the ram being operable to urge the piston rod alternately away from and toward the housing;

a head being coupled to a distal end of the piston rod of the ram with respect to the base, the head defining a cavity in the head, the cavity having a size and a shape such that the cavity is configured to be complementary in shape to a perimeter of a stake; and wherein a cross section of the cavity taken perpendicular to the piston rod has a rectangular shape.

2. The apparatus of claim 1, wherein a width of the rectangular shape is at least 1.5 inches, a length of the rectangular shape being at least 3.5 inches.

3. The apparatus of claim 1, further comprising:

a width of the rectangular shape being at least 1.5 inches, a length of the rectangular shape being at least 3.5 inches;

a motor being mounted to the housing, the motor being selectively operatively couplable to the ram, the motor comprising an internal combustion engine;

a hydraulic pump being mounted in the housing, the hydraulic pump being operably coupled to the motor;

a reservoir being mounted in the housing, the reservoir being in fluid communication with the hydraulic pump;

a volume of hydraulic fluid being contained in the reservoir;

a control valve being in fluid communication with the hydraulic pump and the ram, the control valve being operable to direct the hydraulic fluid from the hydraulic pump to the ram to move the piston rod of the ram alternately toward and away from the base;

a handlebar being mounted to the housing, the handlebar having an inverted U-shape having a pair of lateral portions and a top portion, the top portion being coupled to and extending between the pair of lateral portions;

a pair of grips, each grip of the pair of grips being slidably mounted to an associated lateral portion of the pair of lateral portions of the handlebar, each grip of the pair of grips being slidable alternately upwardly and downwardly with respect to the housing;

a plurality of springs being coupled to the pair of grips and the handlebar, the plurality of springs being configured to absorb sudden impulses exerted on the pair of grips relative to the housing;

a directional switch being operatively coupled to the control valve, the directional switch being mounted on one grip of the pair of grips; and a speed control being operatively coupled to the motor, the speed control being operable to control a speed of the motor, the speed control being mounted on another grip of the pair of grips.

4. A piledriving apparatus comprising:

a housing:

a ram being mounted in the housing, the ram comprising a base and a piston rod, the piston rod being movably coupled to the base, the base being positioned in the housing, the piston rod extending through a bottom end of the housing, the ram being operable to urge the piston rod alternately away from and toward the housing;

a head being coupled to a distal end of the piston rod of the ram with respect to the base, the head defining a cavity in the head, the cavity having a size and a shape such that the cavity is configured to be complementary in shape to a perimeter of a stake; and a motor being mounted to the housing, the motor being selectively operatively couplable to the ram.

5. The apparatus of claim 4, wherein the motor comprises an internal combustion engine.

6. The apparatus of claim 4, wherein the ram comprises a hydraulic cylinder, further comprising:

a hydraulic pump being mounted in the housing, the hydraulic pump being operably coupled to the motor;

a reservoir being mounted in the housing, the reservoir being in fluid communication with the hydraulic pump; and a volume of hydraulic fluid being contained in the reservoir.

7. The apparatus of claim 6, further comprising a control valve being in fluid communication with the hydraulic pump and the ram, the control valve being operable to direct the hydraulic fluid from the hydraulic pump to the ram to move the piston rod of the ram alternately toward and away from the base.

8. The apparatus of claim 7, further comprising a directional switch being operatively coupled to the control valve.

9. The apparatus of claim 8, further comprising a speed control being operatively coupled to the motor, the speed control being operable to control a speed of the motor.

10. A piledriving apparatus comprising:

a housing;

a ram being mounted in the housing, the ram comprising a base and a piston rod, the piston rod being movably coupled to the base, the base being positioned in the housing, the piston rod extending through a bottom end of the housing, the ram being operable to urge the piston rod alternately away from and toward the housing;

a head being coupled to a distal end of the piston rod of the ram with respect to the base, the head defining a cavity in the head, the cavity having a size and a shape such that the cavity is configured to be complementary in shape to a perimeter of a stake;

a handlebar being mounted to the housing, the handlebar having an inverted U-shape having a pair of lateral portions and a top portion, the top portion being coupled to and extending between the pair of lateral portions; and a pair of grips, each grip of the pair of grips being slidably mounted to an associated lateral portion of the pair of lateral portions of the handlebar, each grip of the pair of grips being slidable alternately upwardly and downwardly with respect to the housing.

11. The apparatus of claim 10, further comprising a plurality of springs being coupled to the pair of grips and the handlebar, the plurality of springs being configured to absorb sudden impulses exerted on the pair of grips relative to the housing.

* * * * *